United States Patent
Yi et al.

(10) Patent No.: US 8,488,509 B2
(45) Date of Patent: Jul. 16, 2013

(54) METHOD OF MINIMIZING AN UNNECESSARY SCHEDULING INFORMATION RECEPTION IN A WIRELESS COMMUNICATION SYSTEM

(75) Inventors: Seung-June Yi, Gyeonggi-Do (KR);
Sung-Jun Park, Gyeonggi-Do (KR);
Young-Dae Lee, Gyeonggi-Do (KR);
Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 12/900,702

(22) Filed: Oct. 8, 2010

(65) Prior Publication Data

US 2011/0243054 A1     Oct. 6, 2011

Related U.S. Application Data

(60) Provisional application No. 61/250,010, filed on Oct. 9, 2009.

(30) Foreign Application Priority Data

Sep. 29, 2010    (KR) .................. 10-2010-0094780

(51) Int. Cl.
*H04H 20/71*      (2008.01)
*H04B 7/14*       (2006.01)

(52) U.S. Cl.
USPC ............................................ 370/312; 370/315

(58) Field of Classification Search
USPC .......................................................... 370/312
See application file for complete search history.

(56) References Cited

U.S. PATENT DOCUMENTS

| | | | |
|---|---|---|---|
| 2009/0156194 A1* | 6/2009 | Meylan ...................... | 455/422.1 |
| 2010/0309835 A1* | 12/2010 | Kuo .............................. | 370/312 |
| 2011/0080859 A1* | 4/2011 | Phan et al. .................... | 370/312 |
| 2011/0188436 A1* | 8/2011 | Damnjanovic et al. ....... | 370/312 |
| 2012/0163286 A1* | 6/2012 | Huschke et al. .............. | 370/315 |

* cited by examiner

*Primary Examiner* — Noel Beharry
(74) *Attorney, Agent, or Firm* — Morgan, Lewis & Bockius LLP (57) ABSTRACT

The present invention relates to a wireless communication system and a user equipment (UE) providing wireless communication services, and more particularly, a method of minimizing an unnecessary MSI (MCH Scheduling Information) reception by a terminal (UE) during a reception of a MBMS (Multimedia Broadcast/Multicast Service) service in an Evolved Universal Mobile Telecommunications System (E-UMTS), a Long Term Evolution (LTE) system, and a LTE-Advanced (LTE-A) system that have evolved from a Universal Mobile Telecommunications System (UMTS), thereby preventing an unnecessary battery consumption of the terminal.

4 Claims, 11 Drawing Sheets

R/R/E/LCID/F/L sub-header with
7-bits L field

R/R/E/LCID/F/L sub-header with
15-bits L field

FIG 8

R/R/E/LCID sub-header

METHOD OF MINIMIZING AN UNNECESSARY SCHEDULING INFORMATION RECEPTION IN A WIRELESS COMMUNICATION SYSTEM

RELATED APPLICATION

The present application claims priority benefit to the following applications, which contents are all incorporated by reference herein: U.S. Provisional Application No. 61/250,010 filed on Oct. 9, 2009 and Korean Patent Application No. 10-2010-0094780 filed on Sep. 29, 2010.

BACKGROUND OF THE INVENTION

1. Field of the Invention

The present invention relates to a wireless communication system and a user equipment (UE) providing wireless communication services, and more particularly, a method of minimizing an unnecessary MSI (MCH Scheduling Information) reception by a terminal (UE) during a reception of a MBMS (Multimedia Broadcast/Multicast Service) service in an Evolved Universal Mobile Telecommunications System (E-UMTS), a Long Term Evolution (LTE) system, and a LTE-Advanced (LTE-A) system that have evolved from a Universal Mobile Telecommunications System (UMTS).

2. Description of the Related Art

The LTE system is a mobile communication system that has evolved from a UMTS system, and the standard has been established by 3rd Generation Partnership Project (3GPP), which is an international standardization organization.

Figure 1:
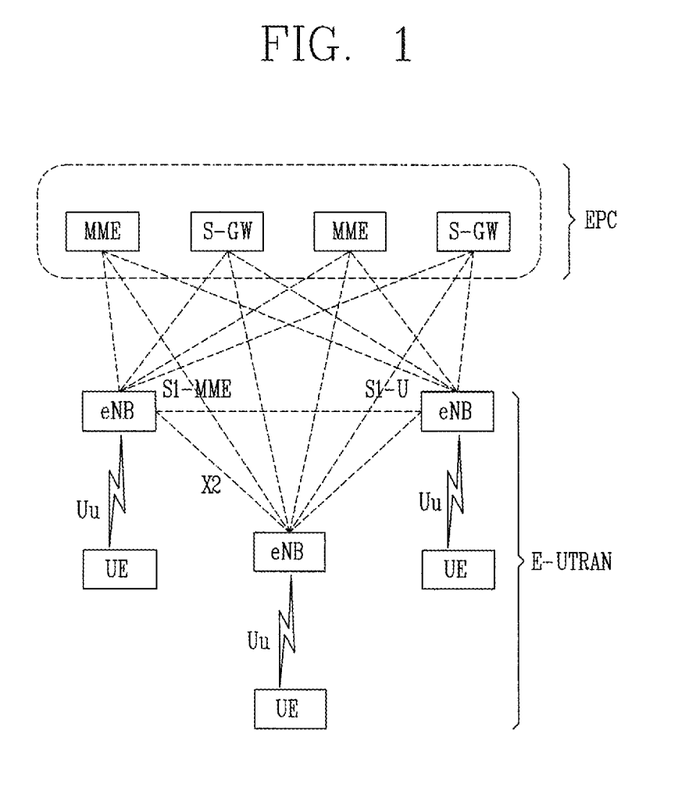
FIG. 1 is a view illustrating the network architecture of an LTE system or an LTE-A system, which is a mobile communication system to which the related art and the present invention are applied.

FIG. 1 is a view illustrating the network architecture of an LTE system, which is a mobile communication system to which the related art and the present invention are applied.

As illustrated in FIG. 1, the LTE system architecture can be roughly classified into an Evolved UMTS Terrestrial Radio Access Network (E-UTRAN) and an Evolved Packet Core (EPC). The E-UTRAN may include a user equipment (UE) and an Evolved NodeB (eNB, base station), wherein the connection between UE-eNB is called a Uu interface, and the connection between eNB-eNB is called an X2 interface. The EPC may include a Mobility Management Entity (MME) performing a control-plane function and a Serving Gateway (S-GW) performing a user-plane function, wherein the connection between eNB-MME is called an S1-MME interface, and the connection between eNB-S-GW is called an S1-U interface, and both connections may be commonly called an S1 interface.

Figure 2:
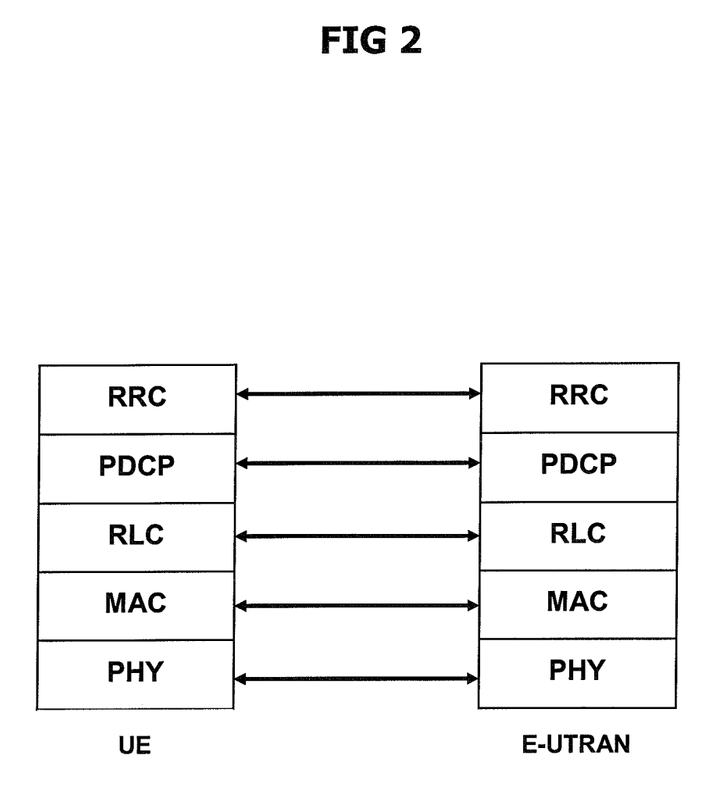
FIG. 2 is an exemplary view illustrating the control plane architecture of a radio interface protocol between UE and E-UTRAN in an LTE system or an LTE-A system, which is a mobile communication system to which the related art and the present invention are applied.
Figure 3:
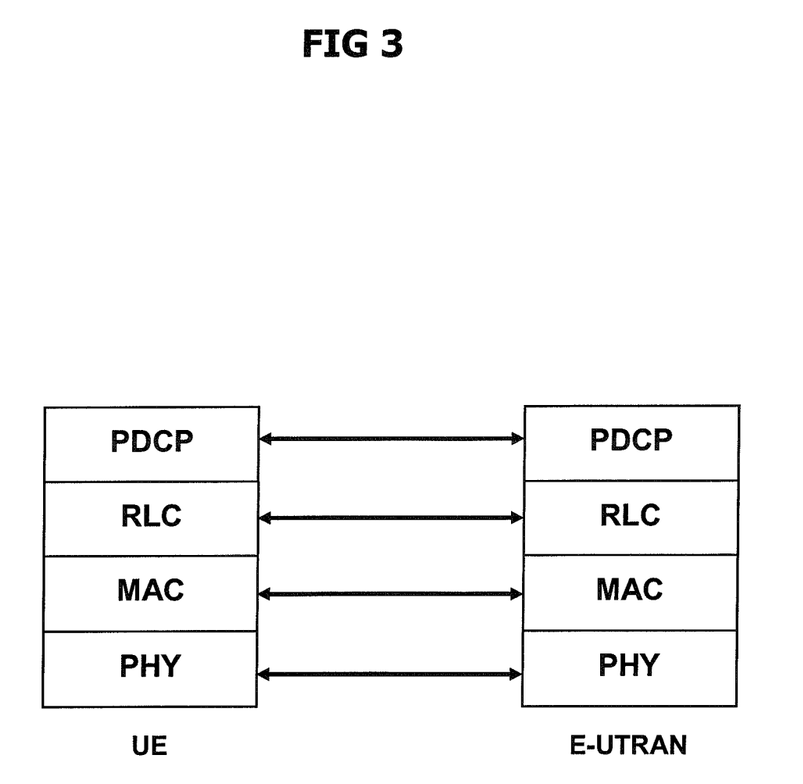
FIG. 3 is an exemplary view illustrating the user plane architecture of a radio interface protocol between UE and E-UTRAN in an LTE system or an LTE-A system, which is a mobile communication system to which the related art and the present invention are applied.

A radio interface protocol is defined in the Uu interface which is a radio section, wherein the radio interface protocol is horizontally comprised of a physical layer, a data link layer, a network layer, and vertically classified into a user plane (U-plane) for user data transmission and a control plane (C-plane) for signaling transfer. Such a radio interface protocol can be typically classified into L1 (first layer) including a PHY layer which is a physical layer, L2 (second layer) including MAC/RLC/PDCP layers, and L3 (third layer) including a RRC layer as illustrated in FIGS. 2 and 3. Those layers exist as a pair in the UE and E-UTRAN, thereby performing data transmission of the Uu interface.

FIGS. 2 and 3 are exemplary views illustrating the control plane and user plane architecture of a radio interface protocol between UE and E-UTRAN in an LTE system, which is a mobile communication system to which the related art and the present invention are applied.

The physical layer (PHY) which is a first layer provides information transfer services to the upper layers using a physical channel. The PHY layer is connected to the upper Medium Access Control (MAC) layer through a transport channel, and data between the MAC layer and the PHY layer is transferred through the transport channel. At this time, the transport channel is roughly divided into a dedicated transport channel and a common transport channel based on whether or not the channel is shared. Furthermore, data is transferred between different PHY layers, i.e., between PHY layers at the transmitter and receiver sides.

Various layers exist in the second layer. First, the Medium Access Control (MAC) layer serves to map various logical channels to various transport channels, and also performs a logical channel multiplexing for mapping several logical channels to one transport channel. The MAC layer is connected to an upper Radio Link Control (RLC) layer through a logical channel, and the logical channel is roughly divided into a control channel for transmitting control plane information and a traffic channel for transmitting user plane information according to the type of information to be transmitted.

The Radio Link Control (RLC) layer of the second layer manages segmentation and concatenation of data received from an upper layer to appropriately adjust a data size such that a lower layer can send data to a radio section. Also, the RLC layer provides three operation modes such as a transparent mode (TM), an un-acknowledged mode (UM) and an acknowledged mode (AM) so as to guarantee various quality of services (QoS) required by each radio bearer (RB). In particular, AM RLC performs a retransmission function through an automatic repeat and request (ARQ) function for reliable data transmission.

A Packet Data Convergence Protocol (PDCP) layer of the second layer performs a header compression function for reducing the size of an IP packet header which is relatively large in size and contains unnecessary control information to efficiently transmit IP packets, such as IPv4 or IPv6, over a radio section with a relatively small bandwidth. Due to this, information only required from the header portion of data is transmitted, thereby serving to increase the transmission efficiency of the radio section. In addition, in the LTE system, the PDCP layer performs a security function, which includes ciphering for preventing the third person's data wiretapping and integrity protection for preventing the third person's data manipulation.

A radio resource control (RRC) layer located at the uppermost portion of the third layer is only defined in the control plane. The RRC layer performs a role of controlling logical channels, transport channels and physical channels in relation to configuration, re-configuration, and release of Radio Bearers (RBs). Here, the RB denotes a logical path provided by the first and the second layers for transferring data between the UE and the UTRAN. In general, the establishment of the RB refers to a process of stipulating the characteristics of protocol layers and channels required for providing a specific service, and setting each of the detailed parameter and operation method thereof. The RB is divided into a signaling RB (SRB) and a data RB (DRB), wherein the SRB is used as a path for transmitting RRC messages in the C-plane while the DRB is used as a path for transmitting user data in the U-plane.

Hereinafter, a description of MBMS (Multimedia Broadcast/Multicast Service) will be given. In order to provide the MBMS service to a terminal (UE), in general, the wireless network may provide the MBMS Control Channel (MCCH) and the MBMS Traffic Channel (MTCH) for an MBMS service. The MCCH is used for transmitting MBMS control information to a terminal. The MTCH is used for transmitting the MBMS service to the terminal. The MBMS service is comprised of one session or a plurality of sessions, and only one session should exist for single time period (or duration). The wireless network may transmit an MBMS notification message in order to inform a session start of the MBMS service or a change of the MBMS control information. The notification message may be transmitted via the MCCH channel. Meanwhile, through the MBMS Indicator Channel (MICH), the wireless network notifies the terminal whether or not a MBMS notification message or control information for a specific service has been changed (modified).

In a conventional art, the terminal (UE) must read MCH scheduling information (MSI) in every MCH scheduling period in order to receive a certain MBMS service. However, since a MBMS data can be transmitted intermittently due to its traffic characteristic, in some case, some MBMS data may not be transmitted in the MCH scheduling period. Therefore, if the terminal always wakes in every MCH scheduling period to receive the MSI, this will cause an unnecessary battery consumption of the terminal.

SUMMARY OF THE INVENTION

Accordingly, an object of the present invention is to provide a method of effectively receiving MBMS data transmission in a wireless communication system.

In order to achieve the foregoing object, the present invention may propose a method of receiving a point-to-multipoint service in wireless communication system, the method comprising: receiving scheduling information for the point-to-multipoint service, wherein the scheduling information includes sub-frame information and an indication, wherein the indication indicates a specific multicast channel scheduling period transmitting next scheduling information for the point-to-multipoint service; receiving the next scheduling information for the point-to-multipoint service based on the indication included in the scheduling information; and receiving the point-to-multipoint service according to the received scheduling information.

Further, in order to achieve the foregoing object, the present invention may propose a method of providing a point-to-multipoint service in wireless communication system, the method comprising: transmitting scheduling information for the point-to-multipoint service, wherein the scheduling information includes sub-frame information and an indication, wherein the indication indicates a specific multicast channel scheduling period transmitting next scheduling information for the point-to-multipoint service, wherein the transmitted scheduling information is used by a terminal in order to receive the next scheduling information for the point-to-multipoint service according to the indication included in the scheduling information; transmitting the point-to-multipoint service based on the transmitted scheduling information.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

The present invention may be applied to a 3GPP communication technology, particularly to a Universal Mobile Telecommunications System (UMTS), system, and a communication device and method thereof. However, the present invention is not limited to this, but may be applied to every wire/wireless communication to which technical spirit of the present invention can be applied.

Hereinafter, the construction and operation of preferred embodiments according to the present invention will be described with reference to the accompanying drawings.

First, a detailed description for a MBMS (Multimedia Broadcast/Multicast Service) service will be given as follows.

Figure 4:
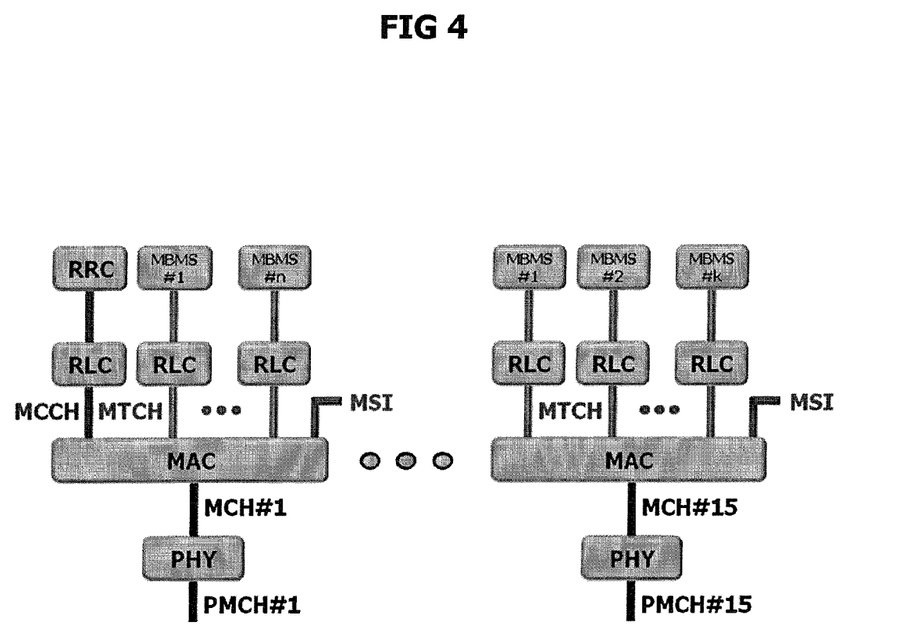
FIG. 4 is an exemplary view illustrating a Multimedia Broadcast/Multicast Service (MBMS) channel structure.

FIG. 4 is an exemplary view illustrating a Multimedia Broadcast/Multicast Service (MBMS) channel structure.

In general, in order to effectively utilize radio resource(s), a MBMS service is transmitted via a common transport channel such as MCH (Multicast Channel). The MCH may be mapped with logical channels of MTCH (Multicast Traffic Channel) and MCCH (Multicast Control Channel), and may be mapped to a physical channel of PMCH (Physical Multicast Channel). Here, the MCH and PMCH is mapped in one to one relationship. Each MCH may be used to transmit a MSI (MCH Scheduling Information) indicating a MCH scheduling information at every MCH scheduling period. Here, the MSI may be in a form of a MAC control element.

Figure 5:
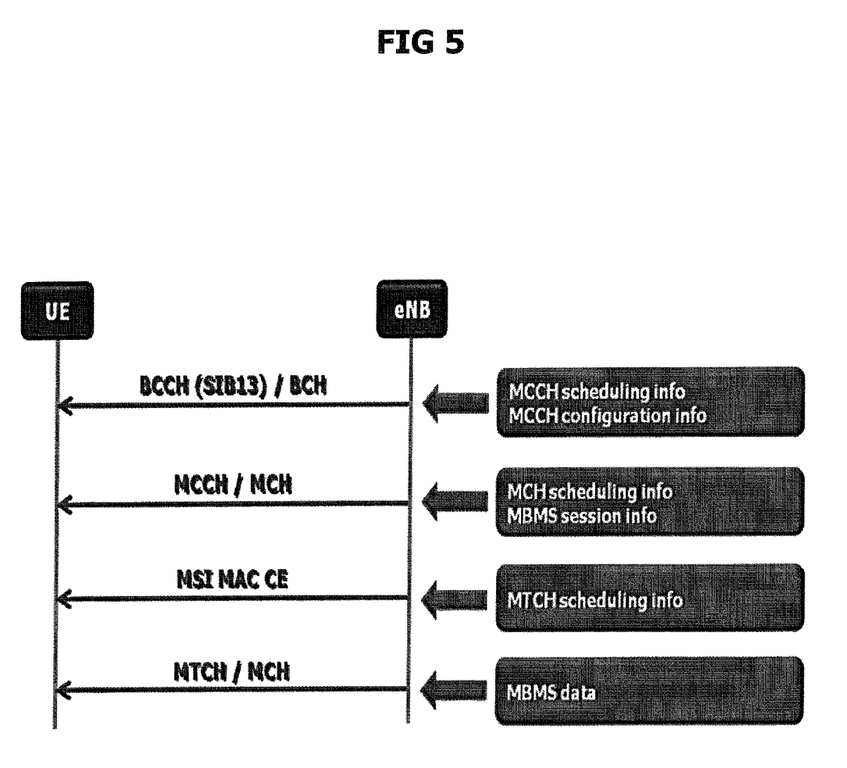
FIG. 5 is an exemplary view illustrating a MBMS service reception procedure.

FIG. 5 is an exemplary view illustrating a MBMS service reception procedure.

In general, in order to receive a MBMS service, the terminal (UE) may receive a MBMS data transmitted via a MTCH. Here, in order to receive MTCH, the MBMS service reception procedure illustrated as FIG. 5 must be performed. First, the UE may obtain MCCH scheduling information and MCCH configuration information by receiving system information (e.g., SIB 13) via a BCCH (Broadcast Control Channel). Here, the MCCH scheduling information may include information about a MCCH modification period and a MCCH repetition period. Further, the MCCH scheduling information may also include information indicating a particular sub-frame carrying the MCCH. The MCCH configuration information may indicate a type of MCS (modulation and coding scheme) used at the particular sub-frame. Namely, by receiving the system information (SIB 13), the terminal can properly receive the MCCH.

The MCCH is repeatedly transmitted in the repetition period, and it may be modified in the modification period. The MCCH may include information with respect to the all MBMS service providing by a corresponding cell, and may include scheduling information with respect to all MCH. Here, a MSI (MCH Scheduling Information) may be introduced to indicate that which MTCH is transmitted at which sub-frame. The MSI may be in a form of a MAC CE (Control Element), and may be transmitted at a first sub-frame in every MCH scheduling period. Therefore, the UE may obtain the MSI by receiving a first sub-frame in every MCH scheduling period, and then may receive the actual MBMS data at a corresponding sub-frame based on the obtained MSI.

As described above, the MSI (MCH Scheduling Information) may be transmitted in a form of a MAC CE (Control Element). The MAC CE may be referred to a control information generated in a MAC layer. The MAC CE may consist of a MAC SDU (Service Data Unit) and a MAC PDU (Protocol Data Unit). A header of the MAC PDU may include a MAC sub-header indicating a type and location of each MAC CE or MAC SDU. A payload of the MAC PDU may include a MAC CE or MAC SDU as indicated by MAC sub-header.

Figure 6:
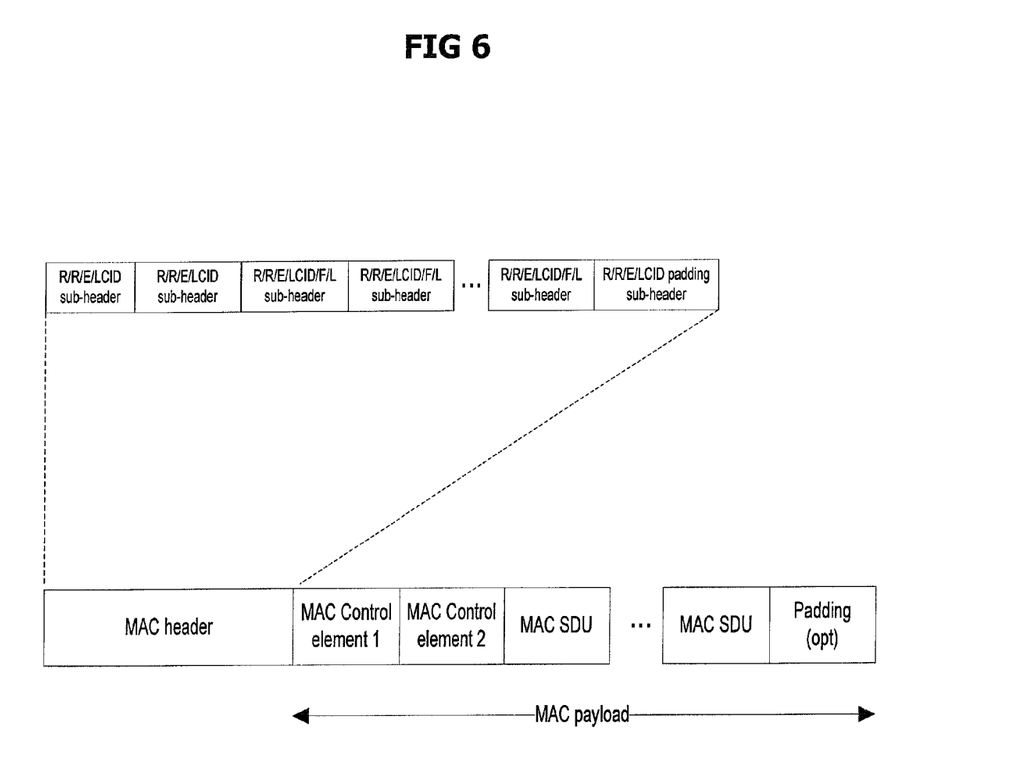
FIG. 6 is an exemplary view illustrating a structure of a MAC PDU (Medium Access Control Protocol Data Unit) used in an LTE or LTE-A system to which the present invention is applied.

FIG. 6 is an exemplary view illustrating a structure of a MAC PDU (Medium Access Control Protocol Data Unit) used in an LTE or LTE-A system to which the present invention is applied.

Each field shown in FIG. 6 will now be described in detail as follows.

R (1 bit): Reserved field.

E (1 bit): Extension field. It informs that whether or not an 'F' field and/or 'L' field is existed in a next byte.

LCID (5 bit): Logical Channel ID field. It informs about a logical channel to which a corresponding MAC SDU belongs, or which information a corresponding MAC CE (MAC Control Element) includes.

F (1 bit): Format field. It informs about the length of a subsequent 'L' field (either 7 bit or 15 bit).

L (7 or 15 bit): Length field. It informs a length of a MAC CE or MAC SDU corresponding to the MAC sub-header.

Here, the 'F' and 'L' field is not included in case with a fixed-sized MAC CE.

Figure 7:
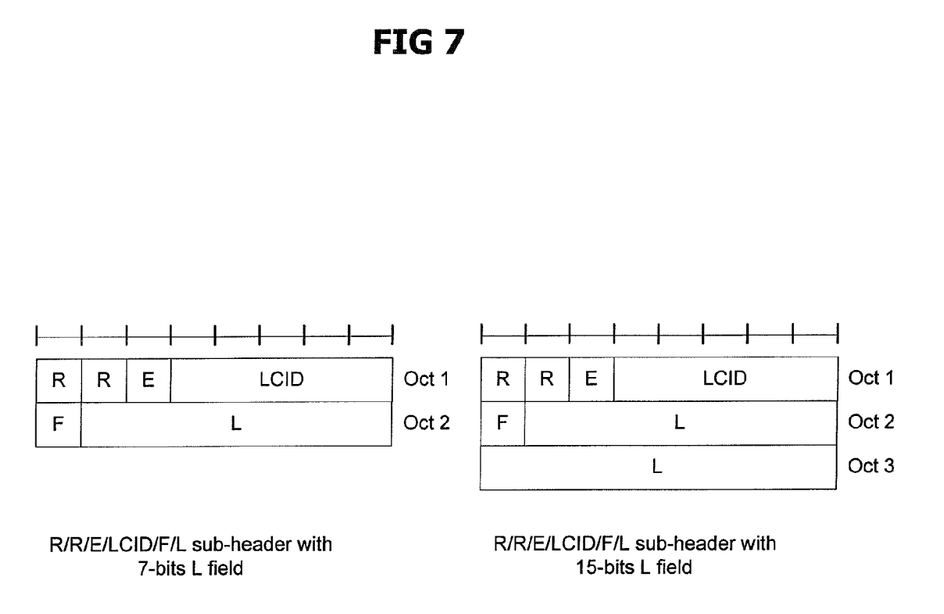
FIG. 7 is an exemplary view illustrating a structure of a MAC sub-header for an variable-sized MAC CE (Control Element) and/or a MAC SDU (Service Data Unit) used in an LTE or LTE-A system to which the present invention is applied.
Figure 8:
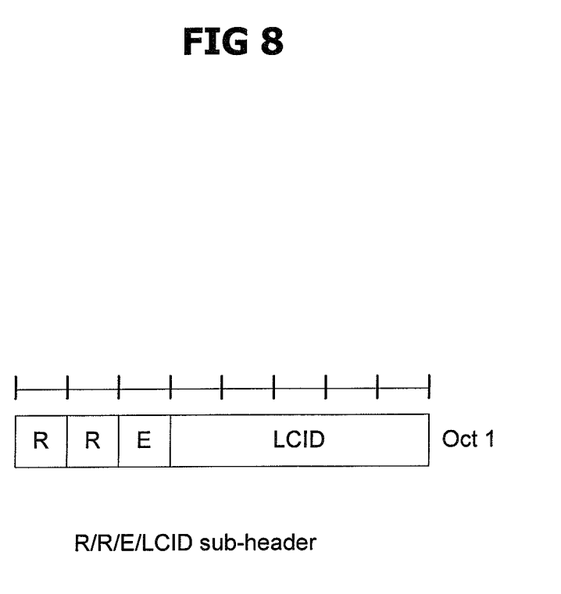
FIG. 8 is an exemplary view illustrating a structure of a MAC sub-header for an fixed-sized MAC CE (Control Element) used in an LTE or LTE-A system to which the present invention is applied.

FIGS. 7 and 8 are exemplary views illustrating a structure of a MAC sub-header for a variable-sized MAC CE (Control Element) and a fixed-sized MAC CE used in an LTE or LTE-A system to which the present invention is applied. As illustrated in FIG. 8, the 'F' and 'L' field are not existed for fixed-sized MAC CE.

In general, the MBMS (Multimedia Broadcast/Multicast Service) control information is provided on a logical channel, such as a MCCH (MBMS control channel). The MCCH may carry a single message which indicates the MBMS sessions that are ongoing as well as the (corresponding) radio resource configuration. The MCCH information may be transmitted periodically, using a configurable repetition period. Here, a change of MCCH information may only occur at specific radio frames, such as a modification period. Within the modification period, the same MCCH information may be transmitted a number of times, as defined by its scheduling that is based on a repetition period.

Usually, a MBMS service may be delivered through a MTCH (MBMS traffic channel) logical channel. The scheduling of MTCH may be dynamically changed, and this change information may be provided by MSI (MCH Scheduling Information). The eNB may periodically provide MSI (MCH scheduling information) at MAC layer as a MSI MAC CE (control element), where the MSI concerns the time domain scheduling of MTCHs within a MCH scheduling period. The MCH scheduling period may be called differently, e.g. MSAP allocation period, Dynamic Scheduling period, etc. The MSI may be placed at the beginning of each MCH scheduling period. The MSI may indicate the sub-frames that each MBMS data is actually transmitted in the MSAP allocation period. Based on the MSI, the UE may determine what sub-frames are used by which MTCH.

As aforementioned, though a MBMS service is ongoing, the actual data may be transmitted intermittently. However, the UE doesn't know when the MBMS data is transmitted, so the UE has to receive the MSI at every MCH scheduling period. As such, at a MCH scheduling period, the UE wakes up and receives the MSI to figure out whether the actual MBMS data is transmitted in this MCH scheduling period. If the MSI indicates that there is a data transmission, then the UE may receive the MBMS data in the sub-frames indicated in the MSI. But if there is no data transmission indicated in the MSI, the UE may sleep again until next MCH scheduling period, and in the next MCH scheduling period, the UE may wake up again and receive the MSI. For a MBMS service with very small data, the actual data transmission is performed only in a few MCH scheduling periods. In this case, such behavior of the UE is not efficient because the UE uselessly receives the MSIs even if there is no data transmission. It causes much waste of UE battery.

Figure 9:
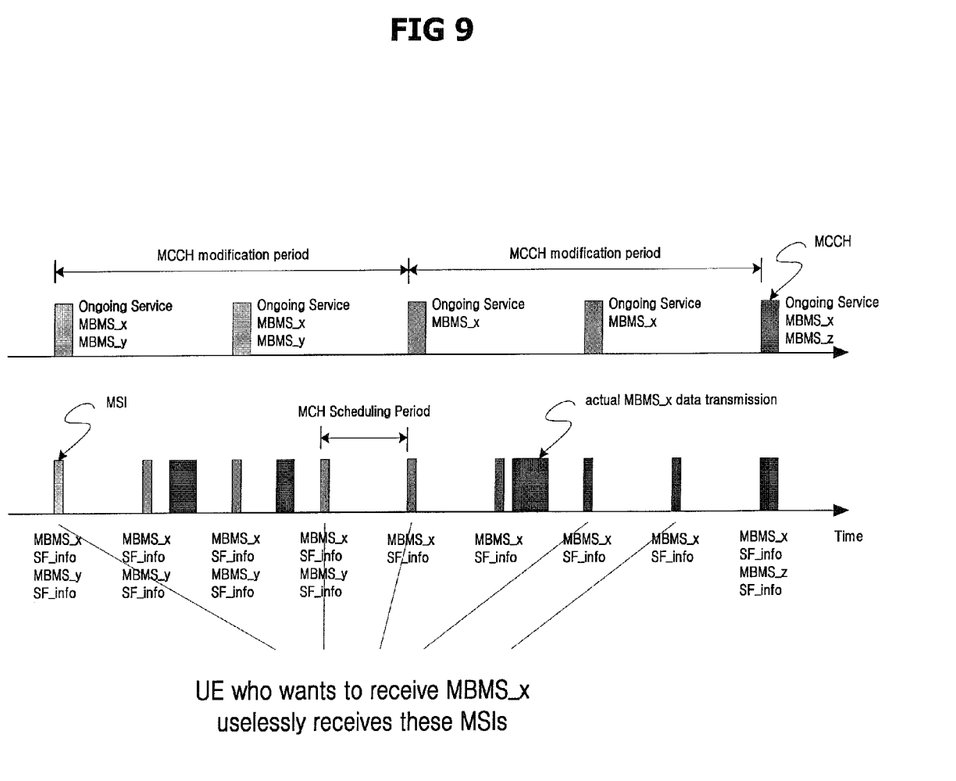
FIG. 9 is an exemplary view illustrating a case that the UE receives unnecessary MSI during a reception of the MBMS service.

FIG. 9 is an exemplary view illustrating a case that the UE receives unnecessary MSI during a reception of the MBMS service.

As illustrated in FIG. 9, if the UE (terminal) wants to receive a MBMS_x service, the UE should receive a MSI (MCH Scheduling Information), which is transmitted in a first sub-frame of MCH scheduling period of the MCH transmitting the MBMS_x service. Then, the UE may determine a specific sub-frame transmitting MBMS_x data transmission in this MCH scheduling period by checking the sub-frame information included in the MSI. Thereafter, the UE receives the MSI (MCH scheduling information) at every MCH scheduling period. However, if there is no data transmission in particular MCH scheduling period, a reception of the MSI in such MCH scheduling period is not necessary.

To avoid UE's receiving of MSIs at every MCH scheduling periods, a MSI skip indication (MSI) may be included in the MSI (MCH Scheduling Information) such that the MSI can indicate up to which MCH scheduling period the UE can sleep. In other words, the MSI may indicate the next MCH scheduling period where the MBMS data is transmitted.
The MSI (MCH Scheduling Information) of each MBMS service may be composed of sub-frame information (i.e. on which sub-frames the MBMS data is transmitted) and MSI (MSI skip indication) (i.e. next MCH scheduling period that the MBMS data is transmitted).

Figure 10:
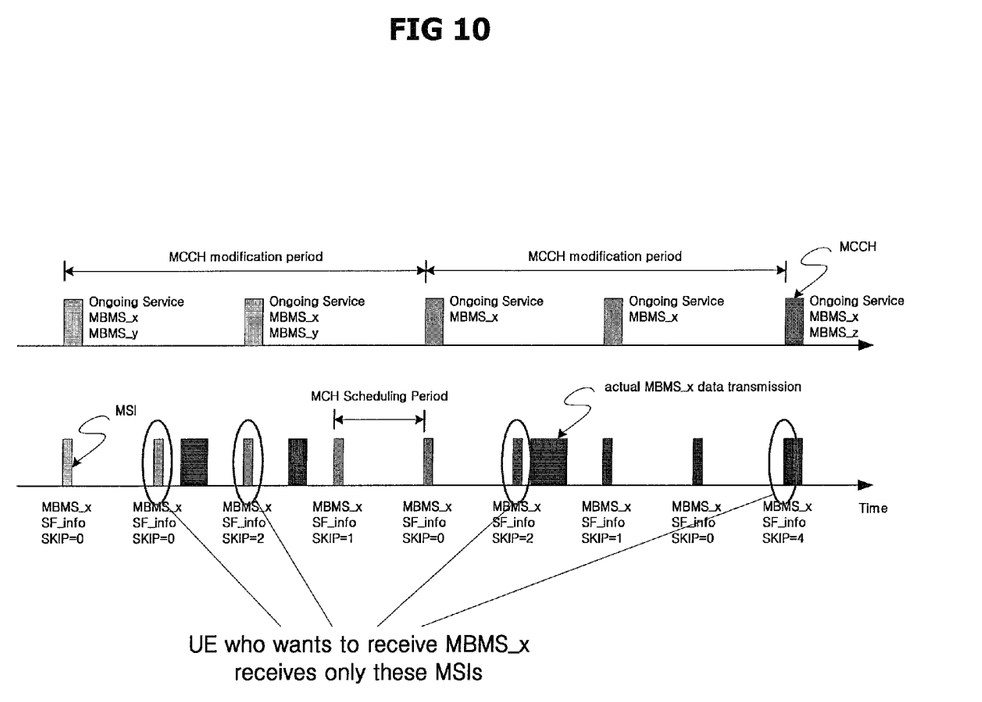
FIG. 10 is an exemplary view illustrating a case that the UE does not receives unnecessary MSI during a reception of the MBMS service by using a MSI skip indication according to the present invention.

FIG. 10 is an exemplary view illustrating a case that the UE does not receives unnecessary MSI during a reception of the MBMS service by using a MSI skip indication according to the present invention.

As illustrated in FIG. 10, the MSI (MSI skip indication) may indicate the offset to the next MCH scheduling period that the actual MBMS data is transmitted. That is, MSI=0 indicates the MBMS data is transmitted in the very next MCH scheduling period (UE shall receive the MSI at very next MCH scheduling period), MSI=2 indicates the MBMS data is transmitted in the third MCH scheduling period from this MCH scheduling period (UE can sleep next two MCH scheduling periods), and so on. As such, at the indicated MCH scheduling period, the UE may wake up and receive the MSI (MCH Scheduling Information), and may receive the MBMS data at the sub-frames indicated in the MSI. For example, if the MSI (MSI skip indication) is set to zero (i.e., MSI=0), then the UE should receive the MSI (MCH Scheduling Information) at the very next MCH scheduling period.

Further optimization may be possible in transmitting sub-frame information. That is, if there is no actual MBMS data transmission, the sub-frame information composed in the MSI (MCH Scheduling Information) may be omitted. For this purpose, a flag may be introduced in the MSI (MCH Scheduling Information) to indicate whether the sub-frame information is included or not in the MSI (MCH Scheduling Information). Here, a special value of MSI may be utilized instead of using of the flag. For example, if the flag or MSI special value is set to zero, this may indicate that there is a sub-frame information for this MBMS service, and if the flag or MSI special value is set to other values other than zero, this may indicate that there is no sub-frame info for this MBMS service. But, in this case, the MSI does not indicate the next MCH scheduling period but only indicates the current MCH scheduling period that the MBMS data is transmitted. Therefore, the UE should receive the MSI at the very next MCH scheduling period even if MSI=0. Therefore, there is a trade-off between one additional MSI reception and sub-frame information transmission.

The MSI (MCH Scheduling Information) may be transmitted as a MAC CE (Control Element). The MSI MAC CE may consist of a header and a payload. The MSI MAC CE header may further consist of a MSI identifier and a length field of the MSI MAC CE payload. Here, the Length field may not be needed if the MSI MAC CE payload has a fixed size or may be calculated by the number of ongoing service included in the MCCH (MBMS Control Channel). The MSI MAC CE payload may further consist of a set of MBMS ID, MSI, and sub-frame information for each ongoing MBMS service. The MBMS ID is usually implemented by a LCID (Logical Channel ID) of the MTCH (MBMS Traffic Channel).

As described above, it is possible to make sub-frame information transmitted only when there is actual data transmission. In this case, a flag is introduced in the MSI. Therefore, a field for the flag (i.e., 'F' field) may be also introduced in the MSI MAC CE. Further, the length field may be included in the MSI MAC CE because optional sub-frame information field causes variation of total length.

Figure 11:
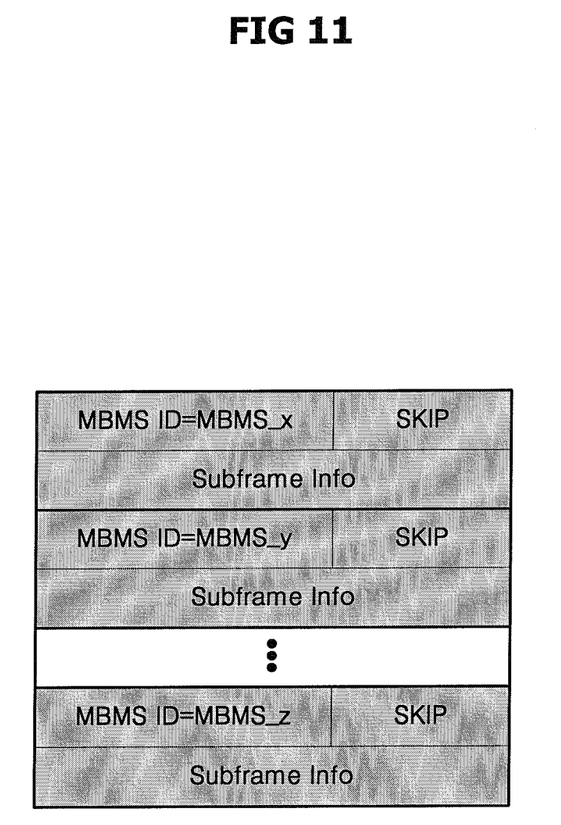
FIG. 11 is an exemplary view illustrating a structure of MSI MAC control element (CE) including the MSI skip indication according to the present invention.

FIG. 11 is an exemplary view illustrating a structure of MSI MAC control element (CE) including the MSI skip indication according to the present invention. As illustrated in FIG. 11, the MSI (MCH Scheduling Information) may be transmitted as a MAC CE (Control Element) via a MCH. The MSI MAC CE may consist of lists of all ongoing MBMS service. For example, the MSI MAC CE may consist of a set of MBMS ID for each MBMS service, a skip information (i.e., MSI (MSI Skip Indication), sub-frame information for each ongoing MBMS service, etc.

The present disclosure may provide a method of receiving a point-to-multipoint service in wireless communication system, the method comprising: receiving scheduling information for the point-to-multipoint service, wherein the scheduling information includes sub-frame information and an indication, wherein the indication indicates a specific multicast channel scheduling period transmitting next scheduling information for the point-to-multipoint service; receiving the next scheduling information for the point-to-multipoint service based on the indication included in the scheduling information; and receiving the point-to-multipoint service according to the received scheduling information, wherein the scheduling information is MCH scheduling information (MSI), the indication is a MSI skip indication, the indication includes a specific value indicating a number of skipping that the terminal should skip a reception of consecutive scheduling information, the scheduling information is received on a first sub-frame of a MCH scheduling period of a multicast channel (MCH) transmitting the point-to-multipoint service, the sub-frame information indicates a specific sub-frame transmitting the point-to-multipoint service within a MCH scheduling period, the scheduling information is received in a form of a MAC control element (CE), and the point-to-multipoint service is a Multimedia Broadcast/Multicast Service (MBMS) service.

It can be also said that the present disclosure may provide a method of providing a point-to-multipoint service in wireless communication system, the method comprising: transmitting scheduling information for the point-to-multipoint service, wherein the scheduling information includes sub-frame information and an indication, wherein the indication indicates a specific multicast channel scheduling period transmitting next scheduling information for the point-to-multipoint service, wherein the transmitted scheduling information is used by a terminal in order to receive the next scheduling information for the point-to-multipoint service according to the indication included in the scheduling information; transmitting the point-to-multipoint service based on the transmitted scheduling information, wherein the scheduling information is MCH scheduling information (MSI) and the indication is a MSI skip indication, the indication includes a specific value indicating a number of skipping that the terminal should skip a reception of consecutive scheduling information, the scheduling information is transmitted on a first sub-frame of a MCH scheduling period of a multicast channel (MCH) transmitting the point-to-multipoint service, the scheduling information is transmitted in a form of a MAC control element (CE), and the point-to-multipoint service is a Multimedia Broadcast/Multicast Service (MBMS) service.

Hereinafter, a terminal according to the present invention will be described.

A terminal according to the present invention may includes all types of terminals capable of using services that can transmits and/or receives data to and/or from each other in a wireless environment. In other words, a terminal according to the present invention may be used in a comprehensive meaning by including a mobile communication terminal (for example, user equipment (UE), portable phone, cellular phone, DMV phone, DVB-H phone, PDA phone, PTT phone, and the like), a notebook, a laptop computer, a digital TV, a GPS navigation, a potable gaming device, an MP3, other home appliances, and the like.

A terminal according to the present invention may include a basic hardware architecture (transmission and/or reception unit, processing or control unit, storage unit, and the like) required to perform the function and operation for effectively receiving the system information as illustrated in the present invention.

The method according to the present invention as described above may be implemented by software, hardware, or a combination of both. For example, the method according to the present invention may be stored in a storage medium (for example, internal memory, flash memory, hard disk, and the like, in a mobile terminal or base station), and may be implemented through codes or instructions in a software program that can be implemented by a processor (for example, microprocessor, in a mobile terminal or base station), and the like.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of receiving a point-to-multipoint service in wireless communication system, the method comprising:
receiving scheduling information for the point-to-multipoint service in a first multicast channel (MCH) scheduling period, where the scheduling information includes an MCH scheduling information (MSI) skip indication and a flag, where the MSI skip indication indicates an offset to a second MCH scheduling period where the point-to-multipoint service is actually to be received, where the offset indicates a number of MCH scheduling periods in which a reception of consecutive scheduling information is skipped, and where the flag indicates whether sub-frame information is included or not in the scheduling information;
sleeping during the offset indicated by the MSI skip indication;
receiving the next scheduling information for the point-to-multipoint service in the second MCH scheduling period based on the MSI skip indication; and
receiving the point-to-multipoint service according to the received next scheduling information,
wherein the MSI is received in a form of a media access control (MAC) control element (CE), the MAC CE including lists of all point-to-multipoint services, a MAC protocol data unit (PDU) including a MAC header, and a MAC payload which includes the MAC CE, the MAC header including an R field, an E field, and a logical channel identity (LCID) field, and
wherein the sub-frame information indicating a specific sub-frame transmitting the point-to-multipoint service within a MCH scheduling period is included in the scheduling information if a value of the flag is 0.

2. The method of claim 1, wherein the scheduling information comprises MCH scheduling information (MSI).

3. The method of claim 1, wherein the scheduling information is received on a first sub-frame of a MCH scheduling period of a multicast channel (MCH) transmitting the point-to-multipoint service.

4. The method of claim 1, wherein the point-to-multipoint service comprises a Multimedia Broadcast/Multicast Service (MBMS) service.

* * * * *